US005334431A

United States Patent [19]

Longtin

[11] Patent Number: 5,334,431

[45] Date of Patent: Aug. 2, 1994

[54] PIGGYBACK ASSEMBLY OF STATIC CLING DECAL, INTERMEDIATE LAYER AND ADHESIVE WEB

[75] Inventor: Andre G. Longtin, Weare, N.H.

[73] Assignee: Moore Business Forms, Inc., Grand Island, N.Y.

[21] Appl. No.: 31,866

[22] Filed: Mar. 16, 1993

[51] Int. Cl.[5] ................................................ C09J 7/02

[52] U.S. Cl. ........................................ 428/40; 283/81; 428/42

[58] Field of Search ........................ 428/40, 42; 283/81

[56] References Cited

U.S. PATENT DOCUMENTS

| | | | |
|---|---|---|---|
| 4,400,419 | 8/1983 | Laczynski | 428/40 |
| 4,475,969 | 10/1984 | Reed | 156/152 |
| 4,652,239 | 3/1987 | Brimberg | 434/80 |
| 5,102,171 | 4/1992 | Saetre | 283/117 |
| 5,174,605 | 12/1992 | Instance | 428/42 |

OTHER PUBLICATIONS

Carrousel Products brochure "Window & Mirror Decorations" (2 pages).

STIK-EES Catalog, Magic Glueless Plastic Decals (pp. 1-10).

*Primary Examiner*—Jenna L. Davis

*Attorney, Agent, or Firm*—Nixon & Vanderhye

[57] ABSTRACT

An assembly of a web substrate, and pluralities of release liners having static cling labels provides a scheme for dispensing static cling labels. The web substrate may be a roll having a surface release coating. The release liners have on one side an adhesive for releasably adhering to the release coating of the web substrate. Static cling labels adhere to the side of each release liner opposite to the adhesive. A release liner with static cling label is removed together from the web substrate. The removed release liner and static cling label are transported to an application surface. At the application surface, the static cling label is removed from the release liner and applied to the surface.

8 Claims, 1 Drawing Sheet

PIGGYBACK ASSEMBLY OF STATIC CLING DECAL, INTERMEDIATE LAYER AND ADHESIVE WEB

FIELD OF THE INVENTION

This invention relates generally to web assemblies including a static cling label.

BACKGROUND AND SUMMARY OF THE INVENTION

Decals and labels that use static forces to adhere to surfaces have become popular in recent years. For example, auto repair shops place on windshields static; cling decals to remind the customer of future maintenance requirements. For example, the decal reminds the customer to change the car oil in six months or 3,000 miles. Static cling labels, also known as decals, are advantageous because they are easily printed or written upon and are readily applied, removed and reapplied to smooth surfaces, such as glass.

Static cling labels are difficult to handle because they tend to fold and adhere to surfaces other than the intended application surface. The clinging ability of the labels is highly beneficial when the label is finally applied to a surface. However, this clinging ability renders cumbersome the manufacture, shipping, storage and handling of static cling labels.

For ease of manufacture, shipping, storage, and handling static cling labels have in the past been applied to releasable liners. These non-adhesive liners have a smooth surface, e.g., release coating, to which the static label clings. For ease of handling, individual liners: carry one or just a few static cling labels. These individual assemblies of release liners and static cling labels are typically used in conjunction with direct retail sales of static cling decals. For example, cartoon character static cling decals sold for children are packaged as individual assemblies of liners and decals. The handling of decals is facilitated by the individual release liners.

In contrast to individual assemblies of liners and decals, continuous web release liners are used to carry a large number of static cling labels. Continuous web assemblies of a liner with numerous decals are typically used for static cling labels used by commercial customers. For example, a release liner roll having hundreds of windshield decals may be sold to auto repair shops. Rolled continuous release liners facilitate the manufacture and shipping (but not final handling) of large quantities of static cling labels. The release liner rolls are delivered to a commercial business and mounted on a decal dispenser. The static cling labels are removed from the rolled web liner at the dispenser and manually carried to the surface to which they are to be applied.

The dispensing of static cling labels from a rolled web release liner has problems in the handling of labels removed from the liner and manually carried to the application surface. Once the static cling label is removed from the liner, the label is susceptible to folding, adhering to the person carrying tile label and to clinging to surfaces to which the label contacts. Another problem is that often the person, e.g., auto repairman, applying the static cling works in a dirty environment has dirty hands. When this person removes the static cling label from the release liner, the label is smudged which denigrates the appearance of the label and the ability of the label to cling to the intended application surface. The greater the distance between the static cling label dispenser and the application surface, the more likely it becomes that the static cling label will be smudged, folded or stacked on another surface. Accordingly, there is a long-felt and unsatisfied need for a system that dispenses static cling labels from a continuous web and protects the label as it is carried from the dispenser to the application surface. The invention disclosed here satisfies this need.

The invention is a web assembly comprising a static cling label adhering to an individual release liner and the release liner is itself piggybacked mounted onto a continuous web substrate. The assembly (of label, release liner and web) may be mounted as a roll on a dispenser at a central location. The user of an individual label peels off a release liner section with one or more static cling labels from the rolled web substrate. The release liner protects the label until the label is removed from the liner and attached to the application surface.

In one embodiment the invention comprises a continuous web substrate, a plurality of individual release liners releasably attached to the continuous web, and at least one static cling label attached to each of the plurality of individual release liners.

In another embodiment the invention is a method for dispensing and applying a static cling label stored in an assembly comprising a web substrate carrying a plurality of release liners wherein each release liner supports a static cling label comprising the following steps: (a) peeling from the web substrate combined release liner having mounted thereon at least one static cling label; (b) transporting the combined release liner and at least one static cling label to an application surface on which the static cling label is to be applied; (c) removing a static cling label from the release liner in the vicinity of the application surface; and (d) applying the removed static cling label to the application surface.

This invention is advantageous in combining the benefits provided by a rolled web in the manufacture and storage of large numbers of static cling labels and the benefits that individual sections of release liners provide in handling individual static cling labels. These advantages and others will become apparent in the following detailed description of the invention.

DETAILED DESCRIPTION OF THE DRAWINGS P

Figure 1:
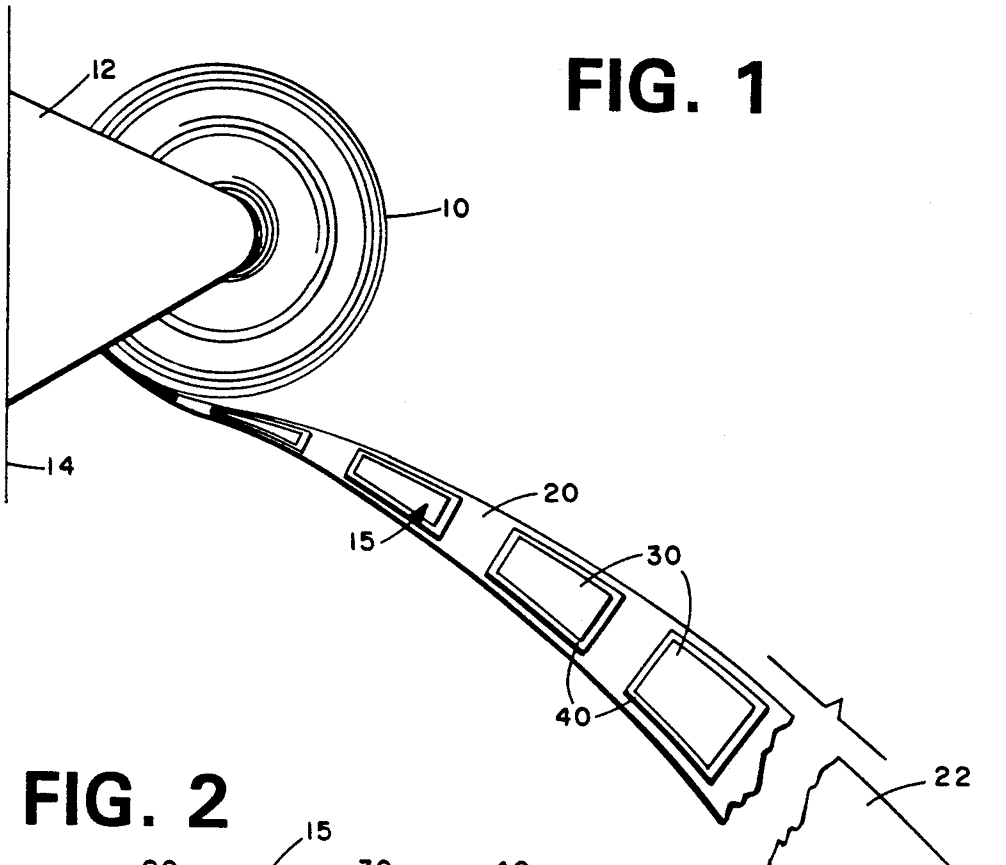
FIG. 1 is a perspective view of a web roll embodiment of the invention mounted on a roller dispenser.

FIG. 1 is a perspective view of a web assembly roll 10 mounted on a dispenser 12 on a wall 14 of a commercial business such as an auto repair shop. The web assembly roll 10 includes a continuous web carrier substrate 20 that can be unrolled from the dispenser 12. On the carrier sheet substrate are mounted individual assemblies 15 of static cling labels 30 mounted on individual release liners 40. In use, the carrier substrate roll is unrolled to expose one or more assemblies 15 of static cling labels and release liners. Each assembly 15 is peeled off of the carrier substrate 20 when a static cling label is desired for use. Once an assembly 15 of a release liner and static cling label(s) has been removed from the carrier substrate 20, the exposed end portion 22 of the carrier substrate is cut or torn from the web roll 10 and discarded.

Figure 2:
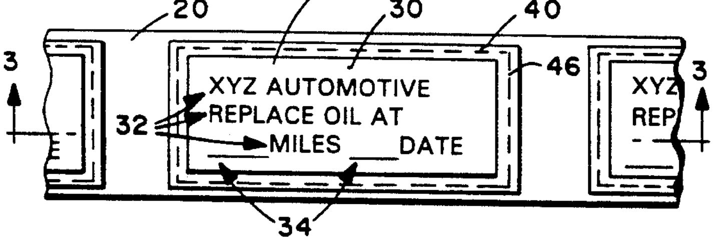
FIG. 2 is a top view of a portion of the web roll embodiment shown in FIG. 1.

FIG. 2 shows a top view of a section of the assembly of the carrier substrate 20, release liner 40 and static cling label 30. Each static cling label includes printing 32 and may include spaces 34 for handwritten or other unique information. These static cling labels are generally highly plasticized electrostatic vinyls that are laminated to the release liner 40. Static cling labels do not themselves have adhesives, but employ static electricity forces to adhere to most clean, smooth surfaces. A conventional top coat may be applied to a static cling label to facilitate handwritten ink printing onto the label.

Static cling labels may be transparent, but for printing and writing that appears on the label. Clear labels are often applied to windshields and windows. Static cling labels may be colored for visibility on surfaces other than windows and windshields. Static cling labels can be applied to dry or wet surfaces. Generally, it is preferable to use a wet application method for static cling labels, if the static cling label is of a medium or large size. Small static cling labels, such as two-inch square decals may be applied on dry, clean surfaces. Static cling labels are commercially available from such companies as Flexcon Company, Inc., of Spenser, Mass.

The release liner 40 to which the static cling label adheres provides a temporary smooth surface holding the label. The label sticks to the liner until the user removes the label from the liner and applies the label to the intended surface such as a windshield. The release liner sheet 40 may be a polycoated bleached liner or a white tag liner. The release liner is generally discarded after the static cling label 30 has been applied to the intended surface.

Each assembly 15 of a static cling label(s) 30 and release liner 40 is mounted by adhesive to the carrier web substrate 20. The carrier web may be either a rolled web 10 such as shown in FIG. 1, or may be a sheet having a large number of static cling labels and release liner assemblies. In either case, once the assembly of release liner and static cling label has been removed from the carrier roll or sheet substrate, the appropriate portion of the carrier can be discarded. In the case of a roll, the vacant end of the carrier web roll from which the release liner has been removed may be torn from the roll and thrown away. In the case of a carrier sheet, the sheet (or a portion of the sheet) can be discarded once all or some of the assemblies of static cling labels and release liners have been removed from the sheet.

The carrier substrate in either sheet or roll form may be a variety of web products such as carbonless webs, bond and carbon webs, letterhead paper and sealed webs such as Sealermate TM commercially offered by the assignee. The assembly 15 of release liner and static cling label may be applied to a roll of carrier web by means of a conventional, motor driven labeler that mounts sequentially individual assemblies of release liner and static cling labels onto the carrier web. An appropriate labeler is the Mark VI Stepper Motor Drive Labeler offered by Machines Systems of Painesville, Ohio.

Figure 3:
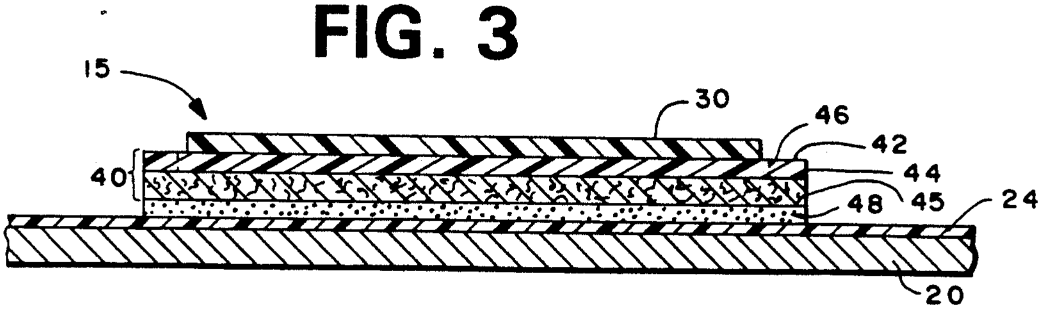
FIG. 3 is a cross-sectional view along line 3—3 of the web roll shown in FIG. 2.

FIG. 3 shows a cross section of the total assembly of static cling label 30, release liner 40 and roll web carrier substrate 20. The release liner 40 has a smooth clean surface 42 to which the static cling label 30 easily adheres. The release liner may be a multiply web having a top ply 44, having a smooth release surface, and a substrate backing 45. The top ply 44 may be scored along a boundary line 46 around the periphery of the static cling label. Scoring the top layer of the release liner facilitates peeling the static cling label from the release liner.

The back of the substrate backing 45 of the release liner (the side opposite to the static cling label 30) attaches to the carrier substrate 20. In a first embodiment, this opposite side of the release liner has an adhesive layer 48 that adheres to the static clean layer. By having the adhesive layer 48 on the release liner the release liner can be removed from the carrier web substrate and reattached temporarily to a carrier, such as business correspondence, from which the static cling label can be later removed and applied. In a second embodiment, the adhesive layer is applied directly to the carrier web substrate and adheres to the release liner. In the second embodiment, the release liner is not sticky to the touch. The selection of embodiments depends on the particular application of the assembly 15 of release liner and static cling label.

With respect to the first embodiment in which the adhesive layer 48 is on the opposite side of the release liner 40, the carrier substrate web 20 has a release coating 24 on its top surface. This release coating 24 is conventional, such as a polymer, and receives the adhesive coated release liner easily. In the second embodiment, the release coating is applied to the back 45 of the release liner.

The invention has been described in its preferred embodiment. However, the invention is not limited to the preferred embodiment. The invention is as broad as set forth in the appended claims.

What is claimed is:

1. An assembly comprising:
a continuous web substrate;
a plurality of individual release liners releasably attached to said continuous web; and
at least one static cling label attached to each of said plurality of individual release liners, wherein said plurality of individual release liners each have an adhesive on a side of said liner opposite to said static cling label and wherein said adhesive adheres to said continuous web substrate.

2. An assembly as in claim 1 wherein said continuous web is a roll.

3. All assembly as in claim 1 wherein said continuous web has a surface coating for releasably receiving said adhesive from the release liners.

4. An assembly as in claim 1 wherein said plurality of release liners are scored on the side of said liners receiving said static cling label.

5. An assembly as in claim 4 wherein said release liners are scored around at least a portion of the perimeter of said static cling labels.

6. An assembly as in claim 1 wherein said plurality of individual release liners comprises a top release liner layer and a backing layer.

7. An assembly as in claim 1 wherein said at least one static cling label is an individual label applied to each of said plurality of individual release liners.

8. An assembly as in claim 1 wherein said continuous web substrate is torn after removal of at least one of said plurality of individual release liners.

* * * * *